(12) United States Patent
Babb

(10) Patent No.: US 8,975,902 B2
(45) Date of Patent: Mar. 10, 2015

(54) POWER CIRCUIT

(75) Inventor: Samuel M. Babb, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 524 days.

(21) Appl. No.: 13/133,267

(22) PCT Filed: Dec. 9, 2008

(86) PCT No.: PCT/US2008/086083
§ 371 (c)(1),
(2), (4) Date: Jun. 7, 2011

(87) PCT Pub. No.: WO2010/068197
PCT Pub. Date: Jun. 17, 2010

(65) Prior Publication Data
US 2011/0234245 A1    Sep. 29, 2011

(51) Int. Cl.
*H02M 1/44*    (2007.01)

(52) U.S. Cl.
CPC .................................. *H02M 1/44* (2013.01)
USPC ............ 324/679; 324/519; 324/522; 324/548

(58) Field of Classification Search
USPC .................. 324/519, 522, 548, 679
See application file for complete search history.

(56) References Cited

U.S. PATENT DOCUMENTS

| | | | |
|---|---|---|---|
| 5,555,165 A * | 9/1996 | Vinciarelli | 363/95 |
| 5,890,097 A | 3/1999 | Cox | |
| 5,936,369 A | 8/1999 | Iwashita et al. | |
| 6,950,950 B2 * | 9/2005 | Sawyers et al. | 713/300 |
| 7,880,508 B2 * | 2/2011 | Presti et al. | 327/58 |
| 2002/0166073 A1 * | 11/2002 | Nguyen et al. | 713/300 |
| 2004/0070908 A1 | 4/2004 | Corcoran et al. | |
| 2004/0090240 A1 * | 5/2004 | Ajit | 326/32 |
| 2004/0174147 A1 * | 9/2004 | Vinciarelli | 323/266 |
| 2005/0157441 A1 * | 7/2005 | Black | 361/100 |
| 2005/0187725 A1 * | 8/2005 | Cox | 702/60 |
| 2006/0261878 A1 * | 11/2006 | Pham | 327/427 |
| 2007/0090693 A1 | 4/2007 | Fox | |
| 2008/0018387 A1 * | 1/2008 | Ryu et al. | 327/541 |
| 2009/0033152 A1 * | 2/2009 | Harris | 307/52 |

OTHER PUBLICATIONS

Redl et al, Optimizing the Load Transient Response of the buck converter, Applied Power Electronics, Feb. 15, 1998, pp. 170-176, vol. 1.*

* cited by examiner

*Primary Examiner* — Huy Q Phan
*Assistant Examiner* — Adam Clarke
(74) *Attorney, Agent, or Firm* — Foley & Lardner LLP

(57) ABSTRACT

Various embodiments provide systems and methods for controlling sub-system components during power disturbance events. More particularly, various embodiments provide systems and methods for preventing a controller (215) within a sub-system from turning OFF a switching device (220) during power disturbance events related to other sub-systems.

12 Claims, 6 Drawing Sheets

POWER CIRCUIT

FIELD OF THE INVENTION

The present invention relates generally to the field of power circuitry. More particularly, the present invention relates generally to controlling circuit components during power disturbances.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In a system/sub-system environment, a plurality of sub-systems may be coupled to a system. The plurality of sub-systems may share a power bus and, therefore, the power received at each sub-system may be directly correlated to power conditions at other sub-systems. Accordingly, an event at one sub-system may cause a power disturbance at another sub-system. This may have a negative effect on the operation of a sub-system not associated with the event.

SUMMARY

Various embodiments provide systems and methods for controlling sub-system components during power disturbances. More particularly, various embodiments provide a system and method for preventing a controller within a sub-system from turning OFF a switching device during power disturbance events related to other sub-systems.

Various embodiments provide an apparatus and methods for measuring a $^+dv/dt$ value above a predetermined threshold; scaling the $^+dv/dt$ value by a capacitance (C) value to produce a $^+Cdv/dt$ value; scaling the $^+Cdv/dt$ value based on a gain (K) of a current sensing component to produce a $^+KCdv/dt$ value; and subtracting the $^+KCdv/dt$ value from an increased current associated with a power disturbance.

Various embodiments also provide an apparatus comprising a circuit for receiving a $^+Cdv/dt$ value, the circuit configured to determine if a current level or a voltage level associated with the $^+Cdv/dt$ value is greater than a predetermined threshold and output a signal to a switching device if the current level or the voltage level associated with the $^+Cdv/dt$ value is greater than a predetermined threshold, wherein the signal causes the switching device to switch to an OFF state.

The features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the attached drawings, in which.

DETAILED DESCRIPTION OF THE PREFERRED EMBODIMENTS

Various embodiments provide systems and methods for controlling sub-system components during power disturbances. More particularly, various embodiments provide a circuit and method for preventing a controller within a sub-system from turning OFF a switching device during power disturbance events related to other sub-systems.

Figure 1:
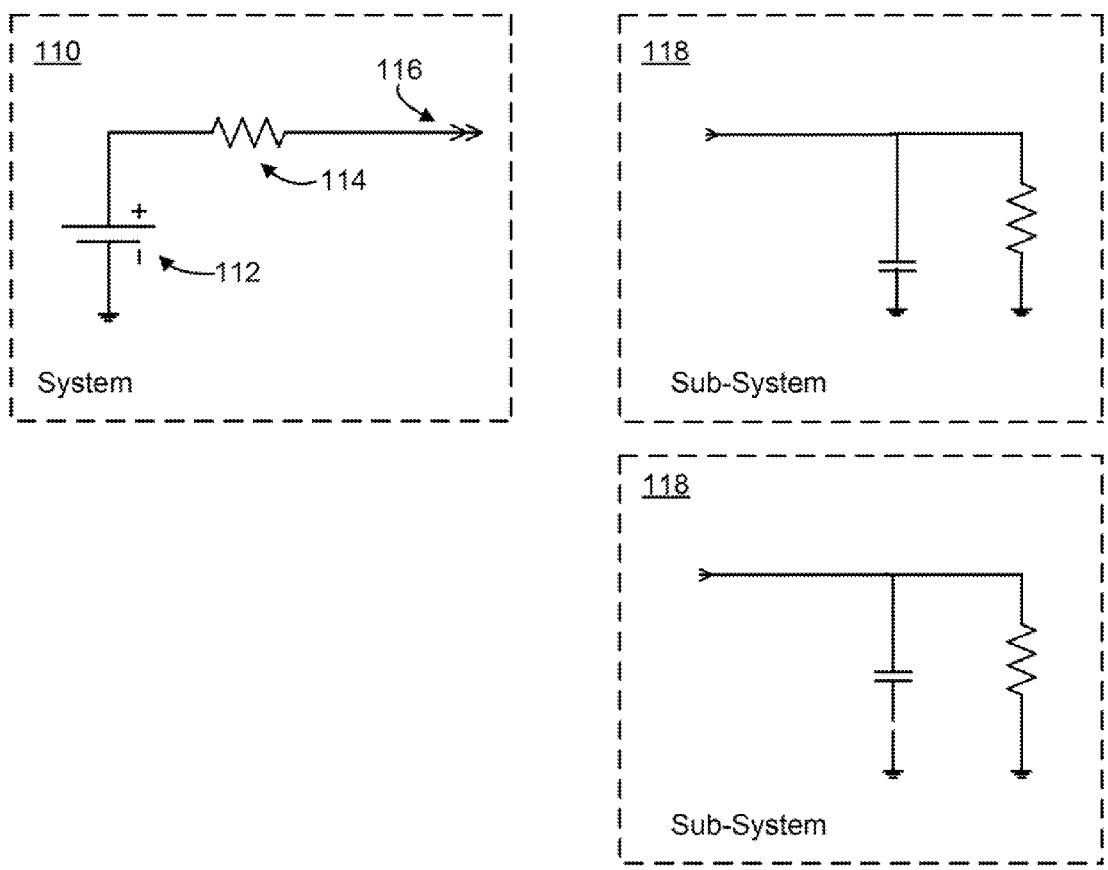
FIG. 1 is a circuit schematic of an exemplary implementation of various embodiments of a system.

FIG. 1 illustrates an exemplary system 110 of the present application. The system 110 may be a system enclosure, a card cage, a main system, a cabinet, or similar structures. For simplicity purposes, the system is modeled as a Thevenin equivalent comprising a power source 112 and a series resistor 114. However, as one of ordinary skill in the art would readily understand, the system 110 is actually more complex and comprises a plurality of components arranged in a specific manner to interconnect with and provide power to various sub-systems 118. These sub-systems 118 are interconnected with the system 110 via one or more connectors 116. The system 110 is arranged such that one or more sub-systems may be inserted or otherwise coupled to the system 110.

Figure 2:
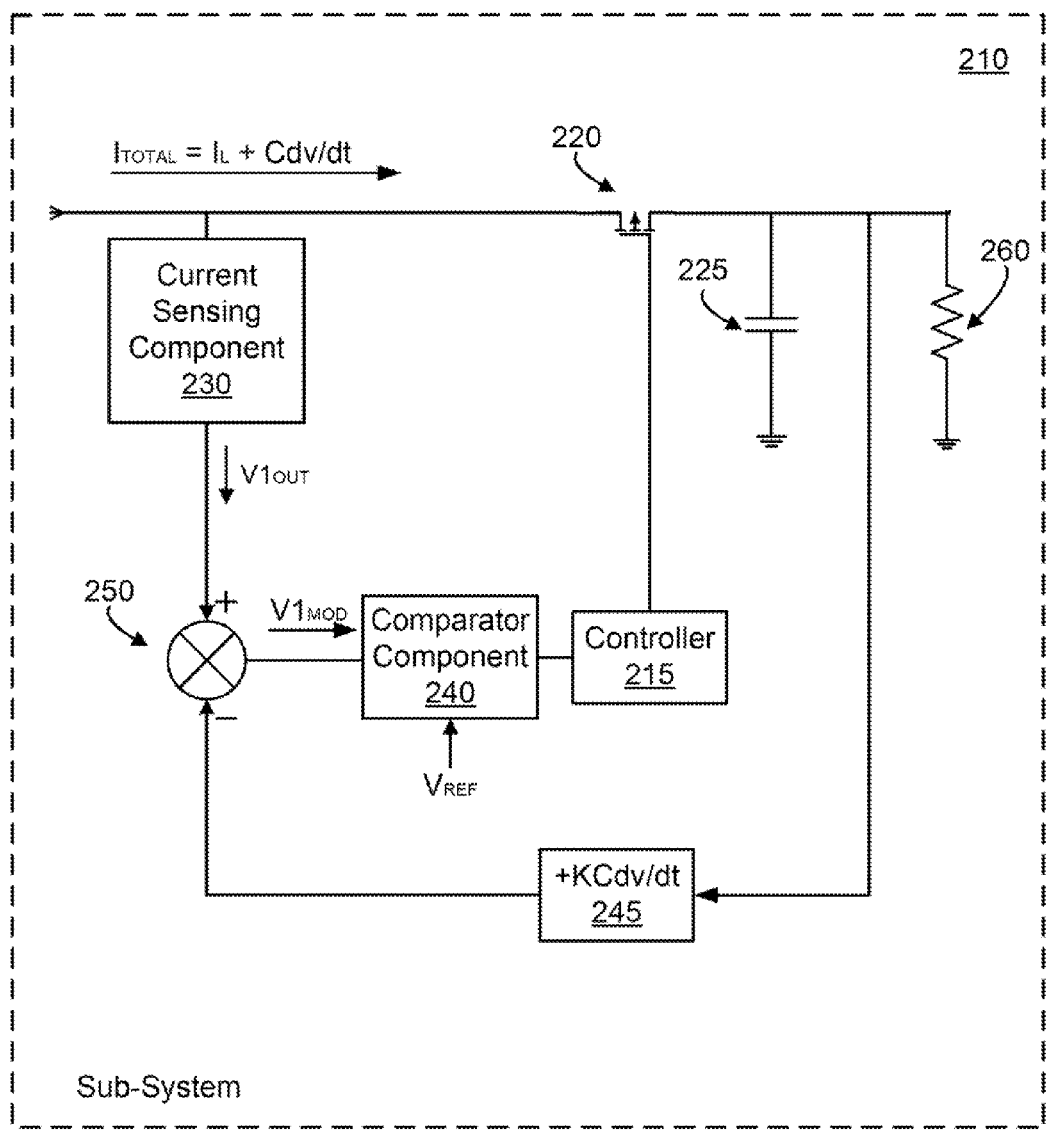
FIG. 2 is a circuit schematic of an exemplary implementation of various embodiments of a sub-system.

FIG. 2 illustrates an exemplary implementation of various embodiments of the present application. More particularly. FIG. 2 illustrates a sub-system 210 configured to be interconnected with system 110 or inserted therein. Although only one sub-system 210 is illustrated, there may be one or more sub-systems electronically coupled with the system 110. As described herein, the sub-system 210 may be a sub-assembly, an add-in-card, a cell, a board, or similar structures. Accordingly, a system 110, such as a card cage or cabinet, may include one or more sub-systems, such as a card or blade.

Each sub-system 210 of the present application includes a circuitry arrangement which prevents a controller 215 from turning OFF a switching device 220 in response to a positive increased current ($^+Cdv/dt$). The increased current ($^+Cdv/dt$) may occur due to a fault condition at another sub-system, a sub-system insertion, or another event which may raise the positive current provided to sub-system 210.

FIG. 2 illustrates an exemplary embodiment of the present application which prevents a controller 215 from turning OFF a switching device 220 when an increased current ($^+Cdv/dt$) is received at sub-system 210. As used herein, the switching device 220 may be a MOSFET, a PNP transistor, NPN transistor, or similar switching structures. As used herein, the controller 215 may be an electronic-fuse (e-fuse) controller, a hot swap controller, or other similar controlling structures.

When a fault or sub-system insertion occurs with respect to another sub-system (not shown), a power disturbance may occur at sub-system 210. This power disturbance may take the form of an increased current ($^+Cdv/dt$) being received at sub-system 210. When the increased current ($^+Cdv/dt$) is combined with the normal operating current ($I_L$) to a load 260, a total current ($I_{TOTAL}$) is produced which is higher than the normal operating current. This total current may be defined as: $(I_{TOTAL})=[(I_L)+(Cdv/dt)]$, where $I_{TOTAL}$ is the total current during the power disturbance, $I_L$ is the normal operating current to the load 260, C is the capacitance of a capacitor 225, and dv/dt is the rate of voltage change across capacitor 225.

The total current ($I_{TOTAL}$) during a power disturbance may be problematic to sub-system 210. For example, the total current ($I_{TOTAL}$) may be sensed by a current sensing component 230 and thereby trigger controller 215 to turn OFF switching device 220. More specifically, the total current ($I_{TOTAL}$) may cause the current sensing component 230 to output an increased voltage $V1_{OUT}$ directly to the comparator component 240 in response to the power disturbance. As used herein, the current sensing component 230 may be a current sensing amplifier, a resistor, a Hall effect sensor, a current transformer, or similar current sensing structures. When the comparator component 240 receives $V1_{OUT}$ (which is a higher value than normal), it determines that $V1_{OUT}$ is greater than $V1_{REF}$ and sends an indication to controller 215 instructing the controller 215 to turn OFF switching device 220. In order to prevent such occurrences, $V1_{OUT}$ must be reduced before being received at the comparator component 240. As illustrated in FIG. 2, this may be accomplished by removing or subtracting a scaled $^+Cdv/dt$ component 245 from $V1_{OUT}$. If the scaled $^+Cdv/dt$ component 245 is properly subtracted from $V1_{OUT}$, $V1_{MOD}$ is produced. $V1_{MOD}$ has a value which, when compared with $V1_{REF}$, does not trigger the comparator component 240 to send an indication to the controller 215 instructing the controller 215 to turn OFF switching device 220.

Sub-system 210 is arranged to produce a scaled $^+Cdv/dt$ value 245 which is subtracted from $V1_{OUT}$ prior to being received by comparator component 240. The details of scaling the $^+Cdv/dt$ are described in greater detail below with reference to FIG. 3. The scaled $^+Cdv/dt$ value 245 is subtracted from V lour via subtractor 250. The subtractor 250 may be a component configured to subtract two values. Alternatively, the subtracting 250 may be a junction in the circuit. Once the scaled $^+Cdv/dt$ value 245 is subtracted from $V1_{OUT}$, the remaining value is $V1_{MOD}$, where $V1_{MOD}=(I_L)(R_{SENSE})$. $R_{SENSE}$ is a resistance associated with the current sensing component 230. Accordingly, the $^+Cdv/dt$ current caused by the power disturbance is essentially not apparent in $V1_{MOD}$. Therefore, when $V1_{MOD}$ is compared by the comparator component 240 against $V1_{REF}$, the result may be substantially zero. As such, the comparator component 240 will not instruct the controller 215 to turn OFF the switching device 220. It is noted that the when $V1_{MOD}$ is compared by the comparator 240, the result does not have to be substantially zero. Instead, the result may be any value that creates an output from the comparator 240 which does not cause the controller 215 to turn OFF the switching device 220.

It is noted that the although the comparator component 240 and the controller 215 are discussed and illustrated as two separate components, the comparator component 240 and the controller 215 do not have to be separate. The comparator component 240 and the controller 215 may be part of a single component or a single integrated circuit.

It is also noted that the subtraction operation is not limited to the location illustrated in FIG. 2. Instead, the subtraction operation may occur at a different junction. For example, the subtractor 250 may be located prior to the current sensing component 230. In this arrangement a scaled $^+Cdv/dt$ value 245 is subtracted from $I_{TOTAL}$ prior to being sensed by the current sensing component 230. As such, the current sensing component 230 receives a current which docs not include the increased current ($^+Cdv/dt$) caused by the voltage disturbance at another sub-system. Accordingly, the voltage output by the current sensing component 230 to the comparator component 240 will not be an increased value and, therefore, the comparator component 240 will not trigger the controller 215 to turn OFF the switching device 220.

Figure 3:
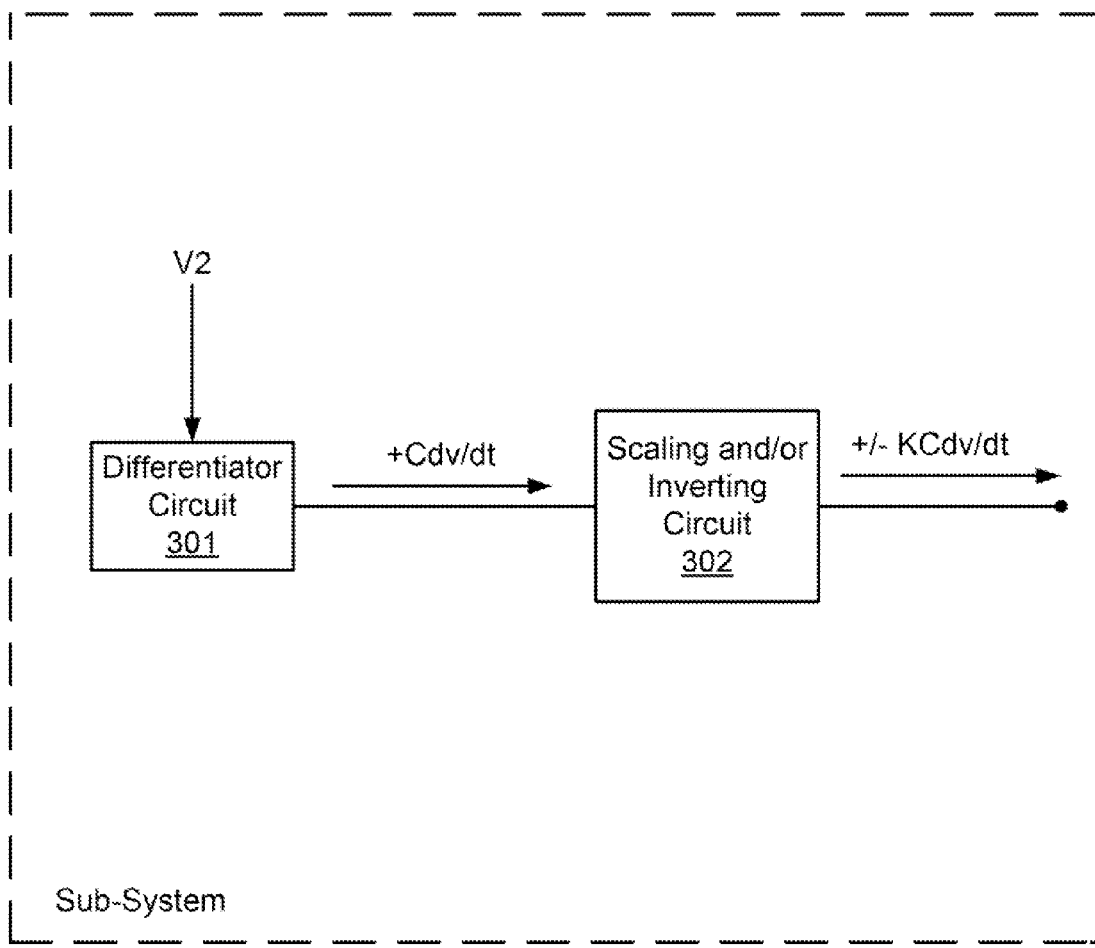
FIG. 3 is a circuit schematic of an exemplary implementation of various embodiments of a sub-system.

FIG. 3 illustrates an exemplary embodiment for producing the scaled $^+Cdv/dt$ value 245. This circuit is for exemplary purposes only and should not be seen as limiting, as other arrangements for producing the scaled $^+Cdv/dt$ value 245 may also be used. As illustrated in FIG. 3, a differentiator circuit 301 may be used to sample a voltage (V2) and output a $^+Cdv/dt$ value. More particularly, the differentiator circuit 301 may sample voltage (V2) from a point on sub-system 210 or a point on system 110. Based on the sampled voltage (V2), the differentiator circuit 301 determines a $^+dv/dt$ value. This $^+dv/dt$ value may be scaled by the differentiator circuit 301 based on a capacitance (C) at the output of the controller 215. For example, the $^+dv/dt$ value may be scaled based on the capacitance at capacitor 225. Accordingly, the differentiator circuit 301 produces a $^+dv/dt$ value. It should be noted that the differentiator circuit is configured to only scale $^+dv/dt$ values above a predetermined threshold. That is, nominal or other low $^+dv/dt$ values (below the predetermined threshold), which may be present in normal operating conditions, are not output from differentiator circuit 301. In addition, negative Cdv/dt values arc not output from differentiator circuit 301, since these negative Cdv/dt values are below the predetermined threshold. Accordingly, the differentiator circuit 301 is configured to output $^+Cdv/dt$ values above a predetermined threshold which may be caused by power disturbances.

An exemplary differentiator circuit 301 may comprise a capacitor, an op-amp, a diode, and a resistor. The differentiator circuit 301 outputs $^+Cdv/dt$ to a scaling and/or inverting circuit 302. The scaling and/or inverting circuit 302 may scale the $^+Cdv/dt$ by a scaling value (K). The scaling value K may be a gain value based on the above-discussed current sensing component 230. The scaling and/or inverting circuit 302 may also invert the scaled $^+Cdv/dt$ value. This inversion is dependent upon the arrangement and location of the subtractor 250. The output of the scaling and/or inverting circuit 302 is $^{+/-}KCdv/dt$. As discussed above, this $^{+/-}KCdv/dt$ value is subtracted from $V1_{out}$ or $I_{TOTAL}$, thereby presenting the comparator 240 with a voltage that docs not trigger the controller 215 to turn OFF switching device 220.

Figure 4:
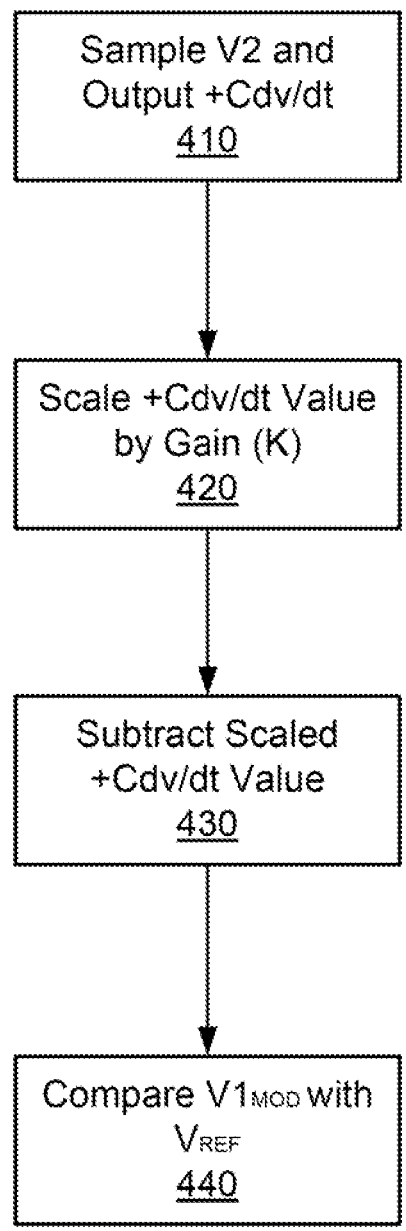
FIG. 4 is a flow chart showing an exemplary implementation of various embodiments.

FIG. 4 is an flow chart illustrating exemplary implementations of various embodiments. At 410, a differentiator circuit samples a voltage (V2) and outputs a $^+Cdv/dt$ value. At 420, the $^+Cdv/dt$ value is scaled by a gain value K. At 430, the scaled $^+Cdv/dt$ value is subtracted from $V1_{OUT}$ thereby removing the $^+Cdv/dt$ component from $V1_{OUT}$ and producing $V1_{MOD}$. At 440, $V1_{MOD}$ is compared by the comparator 240 against $V_{REF}$. This comparison produces an output from the comparator 240 which does not trigger the controller 215 to turn OFF switching device 220.

Figure 5:
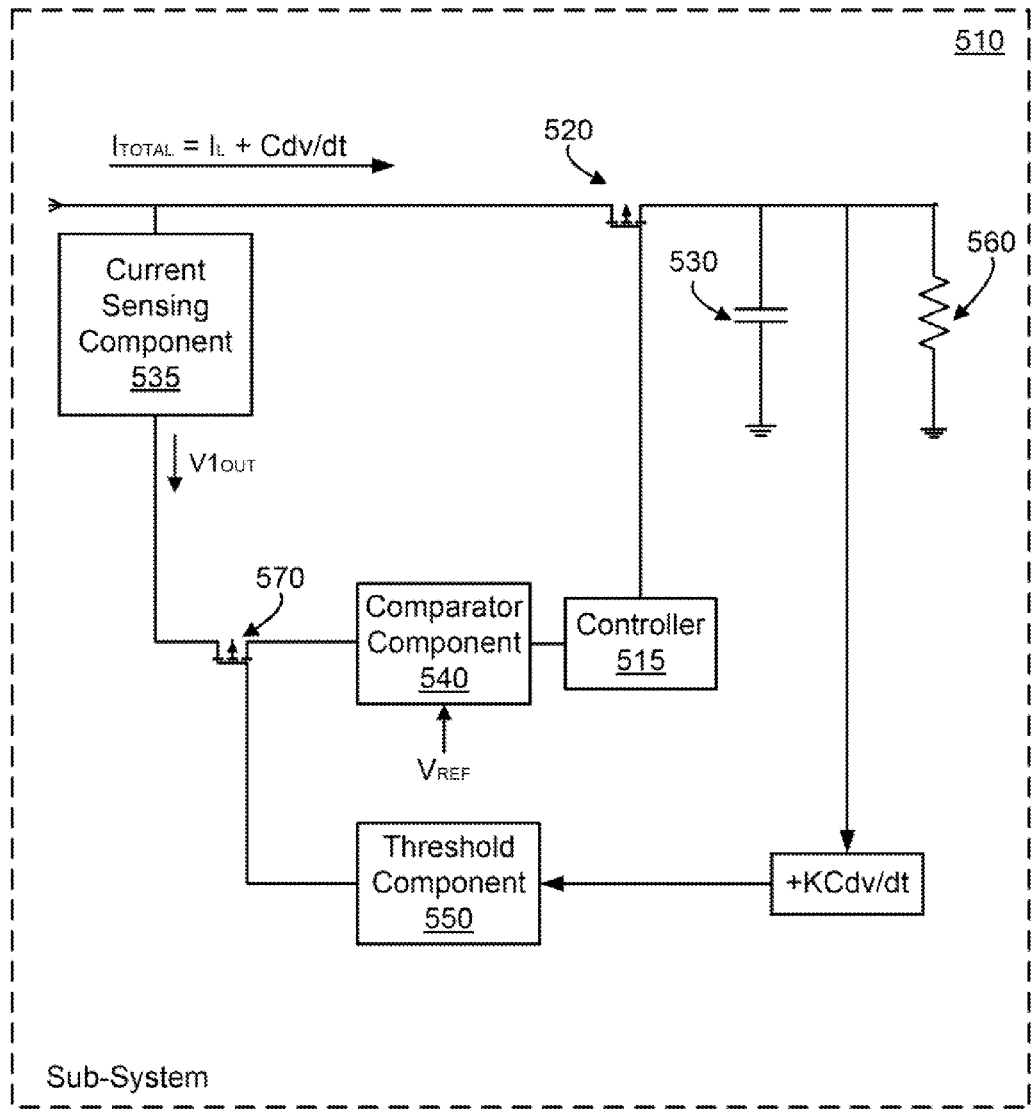
FIG. 5 is a is a circuit schematic of an exemplary implementation of various embodiments of a sub-system.

FIG. 5 illustrates another exemplary embodiment of the present application which prevents a controller 515 from turning OFF a switching device 520 when an increased current ($^+Cdv/dt$) is received at sub-system 510. As discussed above, power disturbance events related to other sub-systems may cause an increased in current ($^+Cdv/dt$) and thereby increase the value of $V1_{OUT}$. This increased value of $V1_{OUT}$ may cause the comparator component 540 to instruct the controller 515 to turn OFF switching device 520 due to $V1_{OUT}$ exceeding $V_{REF}$. To prevent such an occurrence, various embodiments provide a threshold component 550 configured to receive $^+Cdv/dt$ or $^+Cdv/dt$, as defined above. The $^+Cdv/dt$ or $^+KCdv/dt$ may be received in the same manner as described with respect to FIG. 3. The threshold component 550 may be a voltage amplifier or other similar structures configured to determine if a voltage is exceeded. The threshold component 550 determines if a predetermined threshold, e.g., a threshold value close to $V_{REF}$, is exceeded. If the threshold component 550 detects that the predetermined threshold is exceeded, the threshold component 550 is configured to output a signal to a switching device 570 to turn OFF the switching device 570. As such, $V1_{OUT}$ is not received at the comparator component 540. Accordingly, the comparator component 540 is blocked from determining that $V1_{OUT}$ exceeds $V_{REF}$ during power disturbances, and the comparator component 540 does not instruct the controller 515 to turn OFF switching device 520. As used herein, the switching device 570 may be a MOSFET, a PNP transistor, NPN transistor, or similar switching structures.

It should be noted that the threshold component 550 is not limited to measuring voltages. The threshold component 550 may also measure current. This may be done by using, for example, a current amplifier. In this embodiment, the threshold component 550 may sample $^+$Cdv/dt or $^+$KCdv/dt and determine if a current threshold is breached. If so, the threshold component 550 may send a signal to the a switching device 570 to turn OFF, thereby blocking $V1_{OUT}$ from being received at the comparator component 540. Accordingly, the comparator component 540 is blocked from determining that $V1_{OUT}$ exceeds $V_{REF}$ and, therefore, does not instruct the controller 515 to turn OFF switching device 520.

Figure 6:
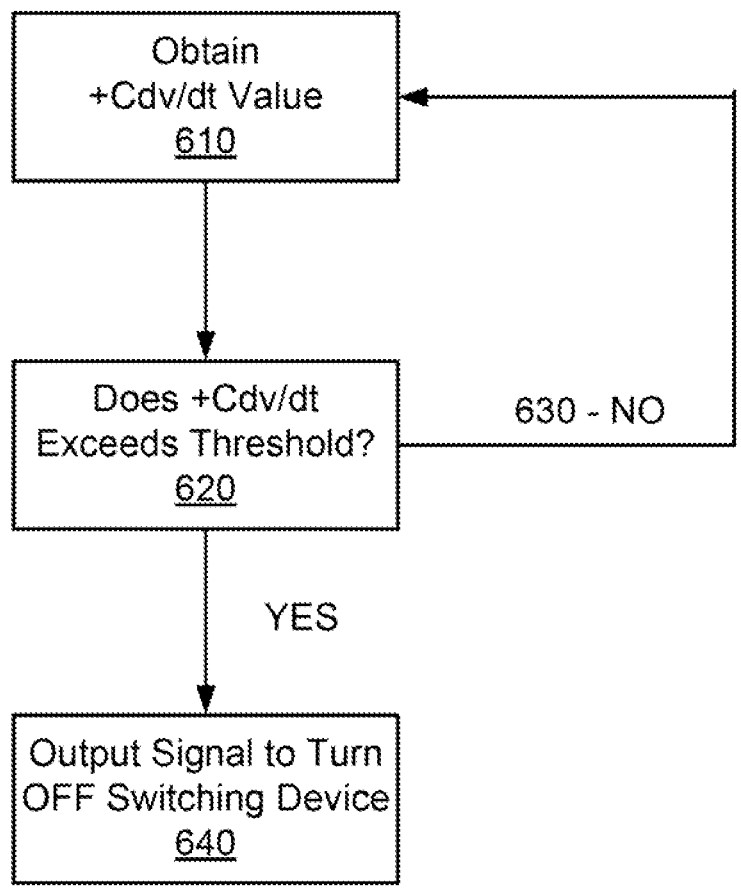
FIG. 6 is a is a flow chart showing an exemplary implementation of various embodiments.

FIG. 6, is an flow chart illustrating exemplary implementations of various embodiments. At 610, a $^+$Cdv/dt or $^+$KCdv/dt value is obtained by a threshold component 550. At 620, the threshold component determines if $^+$Cdv/dt or $^+$KCdv/dt exceeds a voltage or current threshold. At 630, if the threshold is not exceeded, the threshold component 550 continues monitoring $^+$Cdv/dt or $^+$KCdv/dt. At 640, if the threshold is exceeded, the threshold component 550 outputs a signal to a switching device 570 causing the switching device to turn OFF. As such, the comparator component 540 is blocked from determining that $V1_{OUT}$ exceeds $V_{REF}$. Therefore, the comparator component 540 does not instruct the controller 515 to turn OFF switching device 520.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, arc described or otherwise mentioned herein, such references are not intended and should not be interpreted as limiting the scope of the following claims.

What is claimed is:

1. An apparatus, comprising:
a circuit for measuring an instantaneous rate of change of positive voltage over time (a $^+$dv/dt value) above a predetermined threshold and scaling the $^+$dv/dt value by a capacitance value (C) to produce a $^+$Cdv/dt value;
a circuit for scaling the $^+$Cdv/dt value based on a gain (K) of a current sensing component to produce a $^+$KCdv/dt value; and
a circuit for subtracting the $^+$KCdv/dt value from an increased current associated with a power disturbance.

2. The apparatus of claim 1, wherein subtracting the $^+$KCdv/dt value from the increased current causes a switching device controller to maintain a switching device in an ON state.

3. The apparatus of claim 1, wherein the apparatus comprises a sub-system associated with a system.

4. The apparatus of claim 3, wherein the power disturbance is associated with another sub-system associated with the system.

5. The apparatus of claim 1, wherein the capacitance value (C) is based on a capacitance at an output of a switching device controller.

6. A method, comprising:
measuring an instantaneous rate of change of positive voltage over time (a $^+$dv/dt value) above a predetermined threshold;
scaling the $^+$dv/dt value by a capacitance (C) value to produce a $^+$Cdv/dt value;
scaling the $^+$Cdv/dt value based on a gain (K) of a current sensing component (230) to produce a $^+$KCdv/dt value; and
subtracting the $^+$KCdv/dt value from an increased current associated with a power disturbance.

7. A method of claim 6, wherein subtracting the $^+$KCdv/dt value from the increased current causes a switching device controller to maintain a switching device in an ON state.

8. The method of claim 7, wherein the processes of measuring the $^+$dv/dt value and scaling the $^+$dv/dt value are conducted by a differentiator circuit.

9. The method of claim 6, wherein, in response to subtracting the $^+$KCdv/dt value from the increased current associated with the power disturbance, a comparator component is presented with a voltage level that, when compared to a reference voltage, causes the comparator component to output a signal instructing a switching device controller to maintain a switching device in an ON state.

10. An apparatus, comprising:
a circuit for receiving a $^+$Cdv/dt value, wherein C is capacitance and dv/dt is an instantaneous rate of change of positive voltage over time (a $^+$dv/dt value), the circuit configured to determine if a current level or a voltage level associated with the $^+$Cdv/dt value is greater than a predetermined threshold and output a signal to a switching device if the current level or the voltage level associated with the $^+$Cdv/dt value is greater than a predetermined threshold, wherein the signal causes the switching device to switch to an OFF state; and
wherein the $^+$Cdv/dt value is greater than the predetermined threshold during power disturbance conditions; and
wherein switching the switching device to an OFF state prevents a voltage from being received at a comparator; and wherein switching the switching device to an OFF state prevents a switching device controller from changing another switching device to an OFF state.

11. The apparatus of claim 10, wherein the switching device controller is an e-fuse controller or a hot swap controller.

12. The apparatus of claim 10, wherein the predetermined threshold is equal or less than a reference voltage of a comparator.

* * * * *